United States Patent [19]

Zhang et al.

[11] Patent Number: 6,013,896
[45] Date of Patent: Jan. 11, 2000

[54] METHOD OF GAS METAL ARC WELDING

[75] Inventors: Yuming Zhang; Liguo E, both of Lexington, Ky.; Radovan Kovacevic, Plano, Tex.

[73] Assignee: University of Kentucky Research Foundation, Lexington, Ky.

[21] Appl. No.: 09/045,437

[22] Filed: Mar. 20, 1998

[51] Int. Cl.[7] .................................................. B23K 9/09
[52] U.S. Cl. ............................... 219/137 PS; 219/130.51
[58] Field of Search .......................... 219/130.51, 130.31, 219/130.32, 130.33, 130.21, 137 PS, 130.1

[56] References Cited

U.S. PATENT DOCUMENTS

| | | |
|---|---|---|
| 3,683,149 | 8/1972 | Mages et al. . |
| 3,781,511 | 12/1973 | Ryglol . |
| 5,432,317 | 7/1995 | Church .............................. 219/137 PS |
| 5,473,139 | 12/1995 | Matsui et al. . |
| 5,525,778 | 6/1996 | Matsui et al. . |
| 5,643,479 | 7/1997 | Lloyd et al. . |

FOREIGN PATENT DOCUMENTS

| | | |
|---|---|---|
| 60-180674 | 9/1985 | Japan . |
| 60-180675 | 9/1985 | Japan . |
| 06285631 | 4/1993 | Japan . |
| 6142927 | 5/1994 | Japan . |
| 1215892 | 12/1970 | United Kingdom . |
| 2171267 | 8/1986 | United Kingdom ................ 219/130.1 |

OTHER PUBLICATIONS

Kovacevic et al.; On–Line Sensing of Metal Transfer for Adaptive Control of GMA Welding; 4th International Conf. on Trends in Welding Research; Gatlinburg, TN; Jun. 5–8, 1995.

Rhee et al.; Observation of Metal Transfer During Gas Metal Arc Welding; Welding Research Supplement; Oct., 1992; 381–S to 386–S.

Reutzel et al.; Derivation and Calibration of a Gas Metal Arc Welding (GMAW) Dynamic Droplet Model; Trends in Welding Research; Gatlinburg, TN; Jun. 5–8, 1995.

Jones et al.; The Temperal Nature of Forces Acting on Metal Arc Welding; Trends in Welding Research; Gatlinburg, TN Jun. 5–8, 1995.

Watkins et al.; A Dynamic Model of Droplet Growth and Detachment in GMAW; Proceedings of the 3rd International Conference on Trends in Welding Research; 1992; Jun. 1–5.

Wang et al.; A New Close–Loop Droplet Transfer Control System in the Pulsed GMAW; AWS Annual Meeting, Apr. 1994; Philadelphia, PA.

Ueguri et al.; Study of Metal Transfer in Pulsed GMA Welding Welding Research Supplement; Aug. 1985; 242–S to 250–S.

Wang et al.; Arc Light Sensing of Droplet Transfer and its its Analysis in Pulsed GMAW Process; Welding Research Supplement; Nov. 1997; 458–S to 469–S.

Essers et al.; Arc Control with Pulsed GMA Welding; Welding Journal; Jun. 1984; 26–32.

Siewert et al.; Through–the–Arc Sensing for Measuring Gas Metal Arc Weld Quality in Real Time; Materials Evaluation; Nov. 1992; 1314–1318.

Liu et al; Metal Transfer in Gas Metal Arc Welding Droplet Rate; Welding Research Supplement; Feb., 1989; 52–S to 58–S.

*Primary Examiner*—Clifford C. Shaw
*Attorney, Agent, or Firm*—King and Schickli

[57] ABSTRACT

An improved method of gas metal arc welding (GMAW) utilizing relatively low current levels. The method includes providing a variable current to form and detach a droplet from a consumable wire electrode. During the welding process, the current is sufficient to produce a droplet at the end of a consumable electrode wire, but not to independently detach the droplet. After the droplet reaches a desired diameter, the current is lowered to induce an oscillation in the droplet. At a selected oscillation of the droplet, the current is increased. The combination of the momentum created by the oscillation of the droplet and the electromagnetic force caused by the increased current serves to detach the droplet from the electrode wire.

12 Claims, 7 Drawing Sheets

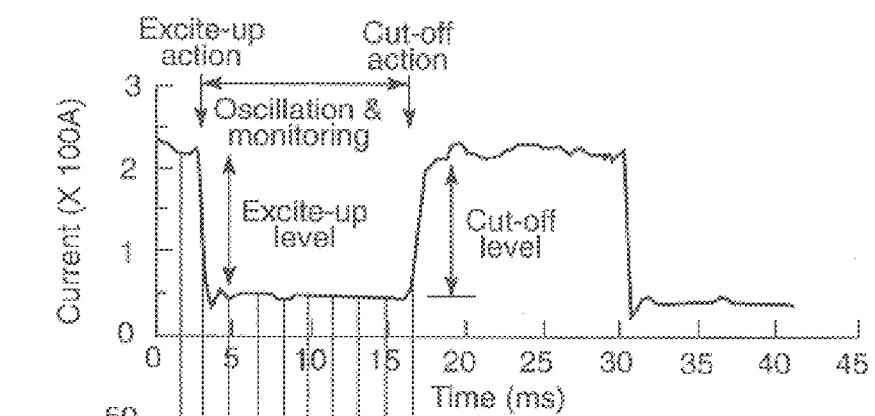
Fig. 3a
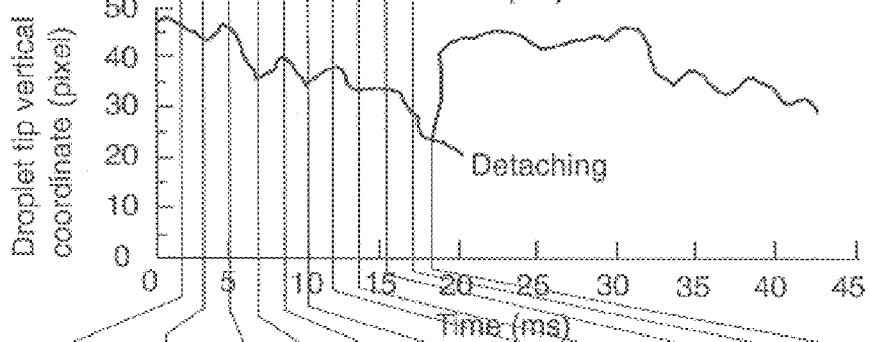
Fig. 3b
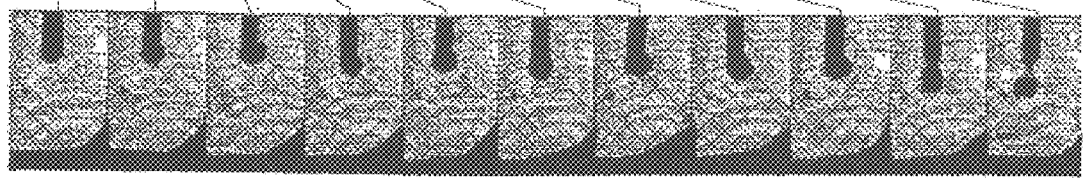

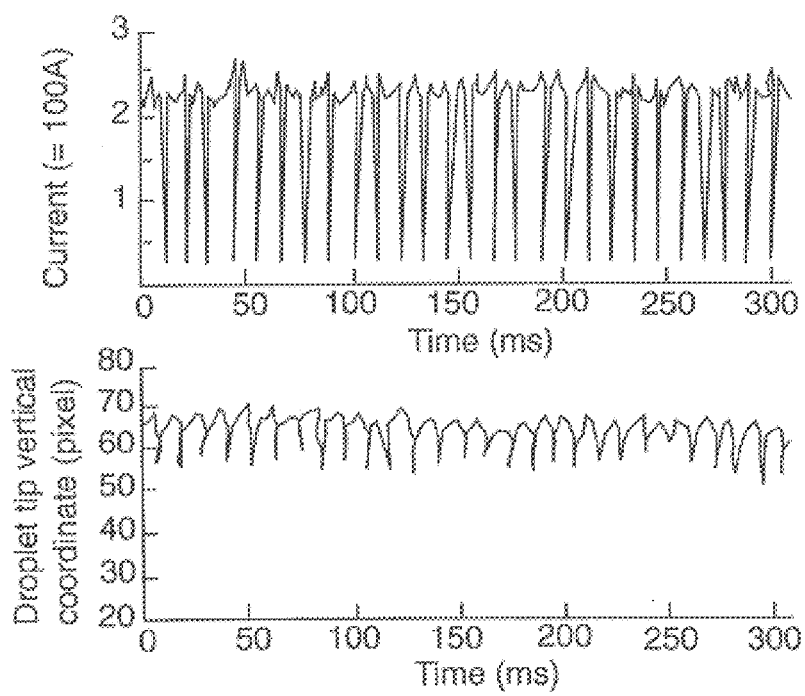
Fig. 4a
Fig. 4b
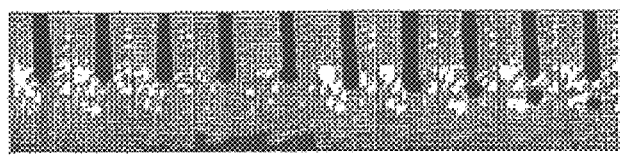

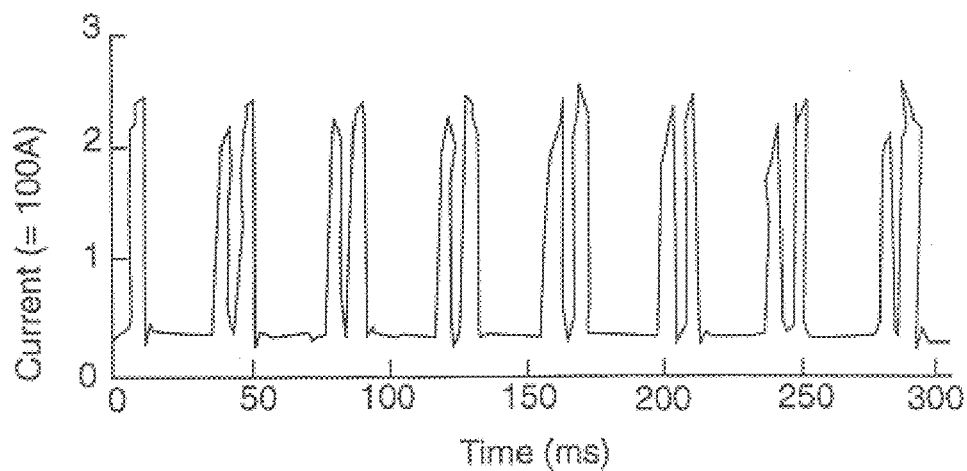
Fig. 6a
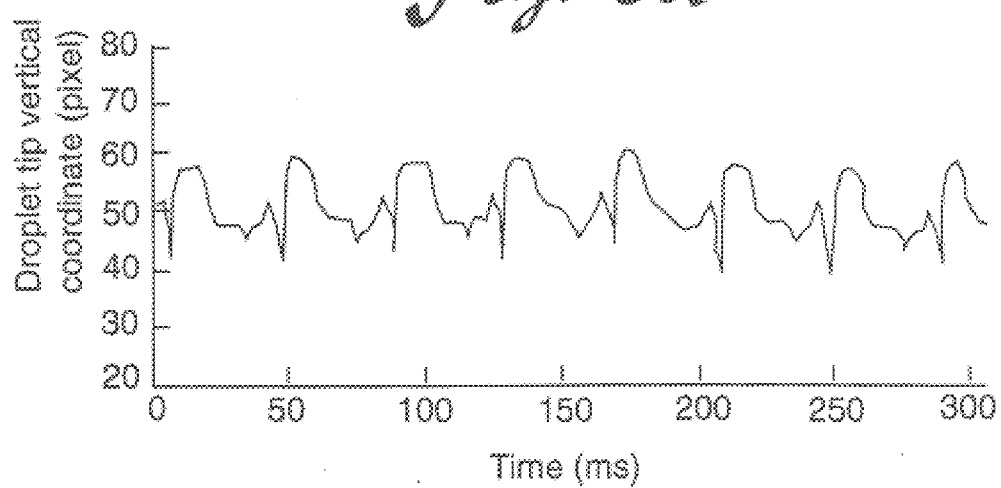
Fig. 6b
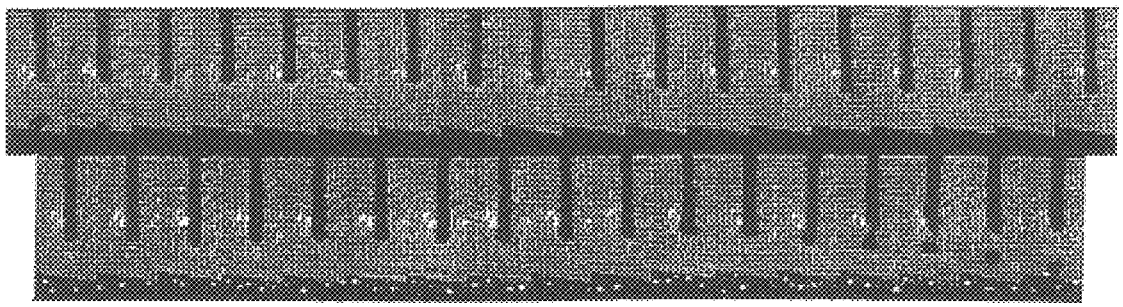

A-metal transfer process with 165 A of average current.

B-metal transfer process with 165 A of average current.

METHOD OF GAS METAL ARC WELDING

TECHNICAL FIELD

The present invention relates generally to the field of metal joining and, more particularly, to an improved method of gas metal arc welding (GMAW) using a variable current.

BACKGROUND OF THE INVENTION

In conventional gas metal arc (GMAW) or metal-inert gas (MIG) welding, an electric current is supplied to a consumable electrode wire to create an arc between the tip of the electrode and a workpiece. Heat created by the arc causes the tip of the electrode to melt, thereby forming a droplet of molten metal. Due to the combination of electromagnetic and gravitational forces present, the droplet ultimately detaches and transfers along the arc to the workpiece. The electric arc and the transfer of droplets from the electrode create a weld pool. As the workpiece is traversed, successive weld pools create a weld bead, which is essential to the metal joining process. Additionally, to improve bead quality, an inert gas is generally provided around the arc. This gas shield serves to protect the metal droplet from the surrounding atmosphere as it transfers across the arc, thereby preventing in-flight oxidation and providing a bead of substantially the same composition as the electrode.

To achieve quality beads with an acceptable appearance, it is desirable to control the detachment of the droplets from the electrode. More specifically, the droplets must continuously reach an optimum size and detach with a known frequency. As can be appreciated, the size of each droplet and the detachment frequency is directly dependent on the level of current supplied to the electrode. It is known that droplet size at the time of detachment decreases as the current increases. This is primarily due to the increased electromagnetic detachment force associated with an increase in current. However, it is equally well known that high currents may also cause droplet superheating, which is associated with poor quality beads due to damaged material property. Such high currents also increase the presence of undesirable fumes and directly affect the mode of droplet detachment and transfer.

It is known that free, or natural, droplet detachment and transfer generally occurs in one of three distinct modes depending on the current level: short-circuit, globular, or spray transfer. In short-circuit transfer, the current remains too low to detach the droplet through electromagnetic force together with the weight of the droplet (or alternatively, the distance between the electrode wire and the workpiece, also known as the arc length, is too short). Thus, the droplet simply grows at a slow rate until it ultimately contacts the weld pool and detaches. This causes a "short-circuit" between the electrode and workpiece. Of course, short-circuiting will lower the arc voltage to zero. To maintain the arc voltage at the set level, the current must be increased. When the droplet is transferred to the weld pool (that is, when the surface tension breaks the liquid metal neck between the weld pool and the electrode tip is broken), the large current will cause the neck to explode and create undesired spatters.

If the current is increased sufficiently to grow the droplet, but remains too low to effect detachment, globular transfer results. In this transfer mode, detachment occurs when the weight of the droplet together with the electromagnetic force simply overcomes the surface tension at the liquid-solid interface (that is, the neck created between the molten metal droplet and the solid, unmelted electrode tip). As can be appreciated, globular transfer results in natural, but uncontrolled detachment, which creates undesirable spatter provides an overly broad weld pool and a nonuniform weld bead. Such uncontrolled detachment is not acceptable for most manufacturing operations, especially where the use of automated or semi-automated welding machines is contemplated.

Further increasing the current results in spray transfer, which can be subdivided into drop (projected) spray or streaming spray. Drop spray results when the current is sufficiently high to detach each droplet having a diameter close to that of the electrode. This current is known as the "transition" current. Drop spray provides the desirable characteristics of uniform droplet size, regular detachment, directional droplet transfer, and also creates little spatter. This produces a more uniform bead.

When the current is increased beyond the transition current, the transfer mode becomes streaming spray. This high current creates small droplets having an increased detachment frequency, both seemingly desirable characteristics. However, this transfer mode is known to create an undesirable finger-shaped penetration in the weld pool that is associated with poor mechanical properties. Also, the use of such a high current increases the presence of undesirable fumes and in many instances causes droplet superheating.

From consideration of the above description, it is clear that the preferred mode of free, natural transfer is drop spray. However, it should also be appreciated that the range of current in which this transfer mode is consistently achieved is extremely narrow. Further complicating matters is the potential for variations in the welding conditions, such as the electrode material, the composition of the shielding gas, and the electrode extension. The combination of a high, but narrow current range and the interdependence on welding conditions create two significant problems, namely: (1) droplet detachment is not always guaranteed for a given set of preselected welding parameters; and (2) the high current and concomitant heat input prevent use of GMAW in workpieces having particularly thin sections or comprised of relatively heat-sensitive materials.

In an effort to solve the aforementioned difficulties, others have proposed the use of a pulsed current, a technique that is well-known in the art. In pulsed GMAW, a base current maintains the arc, while a higher, peak current melts the tip of the electrode wire and detaches the droplet. The combination of base and peak currents over the pulse period results in a lower average current. Of course, this reduces the amount of heat input to the weld pool which, in turn, solves the second problem identified above.

However, the more difficult problem is the ability to consistently achieve drop spray at a lower current independent of the welding conditions presented. In pulsed current GMAW, it is desirable to achieve the detachment of one-drop-per-pulse (ODPP). Conventional pulsed current methods attempt to achieve ODPP by adjusting the duration of the peak current. However, to guarantee detachment and drop spray (that is, to avoid one-droplet multiple pulses (ODMP) or multiple-drops-per-pulse (MDPP)) using conventional methods, such as the method taught in the U.S. Pat. No. 3,683,149 to Mages, the peak current level must always, at a minimum, rise to the transition current level, regardless of changes in duration (see FIG. 7, main amplitude 51 of Mages). Of course, this is a high current level which requires relatively high energy input and could potentially increase fumes. Further, since high current causes the droplet to form and transfer very quickly, the instant of droplet detachment remains difficult to accurately control. This is particularly true in adaptive welding. Specifically, as welding conditions (e.g. the arc length and composition of the shielding gas) and welding parameters (e.g. the base current level and duration) change over the course of the welding operation, the optimum level and duration of the peak current must also change in order to achieve ODPP.

Previous attempts to solve this difficulty include detecting the exact instant of droplet detachment and instantaneously adjusting the current accordingly to provide ODPP. Such proposals include: (1) sensing the arc voltage (arc length) and current level to determine the detachment instant; and (2) detecting audio emissions created by the arc jump from the tip of the electrode to the root of the droplet. Once the detachment instant is determined, the current can be lowered to below the transition current to ensure that only a single droplet is detached, thereby preventing MDPP. However, as can be appreciated, these approaches still rely on natural droplet transfer and, therefore, must always utilize a current at least as high as the transition current. Also, despite these efforts, uncertainty as to the detachment instant and the accompanying droplet size remains.

Accordingly, a need is identified for an improved method of GMAW using pulsed current wherein the detachment of one-drop-per-pulse may be actively controlled. The method would use current levels below the transition current to effect droplet detachment, thereby avoiding the problems associated with the use of high current. Existing equipment would be used to implement the method.

SUMMARY OF THE INVENTION

It is therefore a primary object of the present invention to provide a method of GMAW utilizing a current below the transition current to detach one-drop-per-pulse, thereby overcoming the above-described limitations and disadvantages of prior art methods.

An additional object is to provide a method of GMAW that actively controls droplet detachment and is fully responsive to different welding conditions.

Still another object is to provide a method of GMAW that relies on the momentum created by droplet oscillation combined with electromagnetic forces to effect droplet detachment.

Yet another object is to provide an improved method of GMAW that achieves ODPP at lower current levels and that is easy to implement using conventional welding equipment.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method of gas metal arc welding using a variable current to actively control droplet detachment is provided. In the broadest aspects of the invention, the method includes the steps of supplying a current to form a droplet at the end of the electrode, lowering the current to induce an oscillation in the droplet, and raising the current to detach the droplet. As will be appreciated after reviewing the following disclosure, the method of the present invention advantageously allows for droplet detachment to be actively controlled, while avoiding the above-described limitations and difficulties associated with prior art methods.

For convenience of discussion, the method may be divided into three distinct periods, namely: a growth period in which the droplet is formed, an oscillation period in which the droplet is excited, and a detachment period wherein the droplet is actively forced from the electrode. During the growth period, a pre-determined first, peak current is supplied to the electrode. This current is sufficient to form a molten droplet at the end of the electrode, but is below the transition current (i.e. the current sufficiently high to independently promote or cause droplet detachment at a diameter close to the electrode in the absence of other forces). This current is maintained until the droplet grows to the desired size, which is preferably close to the diameter of the electrode to ensure drop spray transfer.

When the preferred droplet size is reached, the pulse enters the oscillation period. Specifically, this includes the step of lowering the current to a second, base current. The reduction in current excites the droplet to oscillate. The primary amplitude of this oscillation is in a direction toward and away from the workpiece.

During this oscillation, at a selected instant in time when the droplet is moving toward the workpiece with a sufficiently high amplitude, the method enters the detachment period. At this time, the current is increased to higher than the base current, but still below the above-referenced transition current. This increase in current produces an increased electromagnetic force on the droplet which, coupled with the momentum created by oscillation, serves to effect detachment. The method is then repeated to detach a succeeding droplet, thereby forming the weld pool together with the electric arc and, as the workpiece is traversed, the weld bead.

Thus, as can now be appreciated, the present method advantageously permits droplet detachment to be actively controlled by varying the current supplied to the electrode while simultaneously maintaining the current at a level below the transition current at all times. This allows the droplets to be detached at a desired size and at exact, selected instants in time, while avoiding the creation of deleterious fumes and the other problems associated with the use of high currents that is characteristic of prior art GMAW methods (e.g. high current usage, imprecise droplet control, spatter, poor bead quality). Of course, the use of a lower current also reduces the average current which, in turn, decreases the heat input to the weld pool. This avoids superheating conditions and allows for relatively thin sections of workpiece and heat-sensitive materials to be effectively welded.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings:

FIGS. 3a and 3b are graphs of the current level and vertical droplet coordinate over time, showing the basic implementation of the method of the present invention, as described in Example 1;

FIGS. 4a, 4b and 5a, 5b are similar graphs showing the experimental results of the effect of peak current duration on droplet size and transfer frequency, as set forth in Example 2;

FIGS. 6a and 6b are similar graphs showing experimental results, including the addition of a base current duration after the peak current to reduce the average current/heat input, as set forth in Example 3;

Reference will now be made in detail to the present preferred embodiment of the invention, an example of which is illustrated in the accompanying drawings.

DETAILED DESCRIPTION OF THE INVENTION

Figure 1:
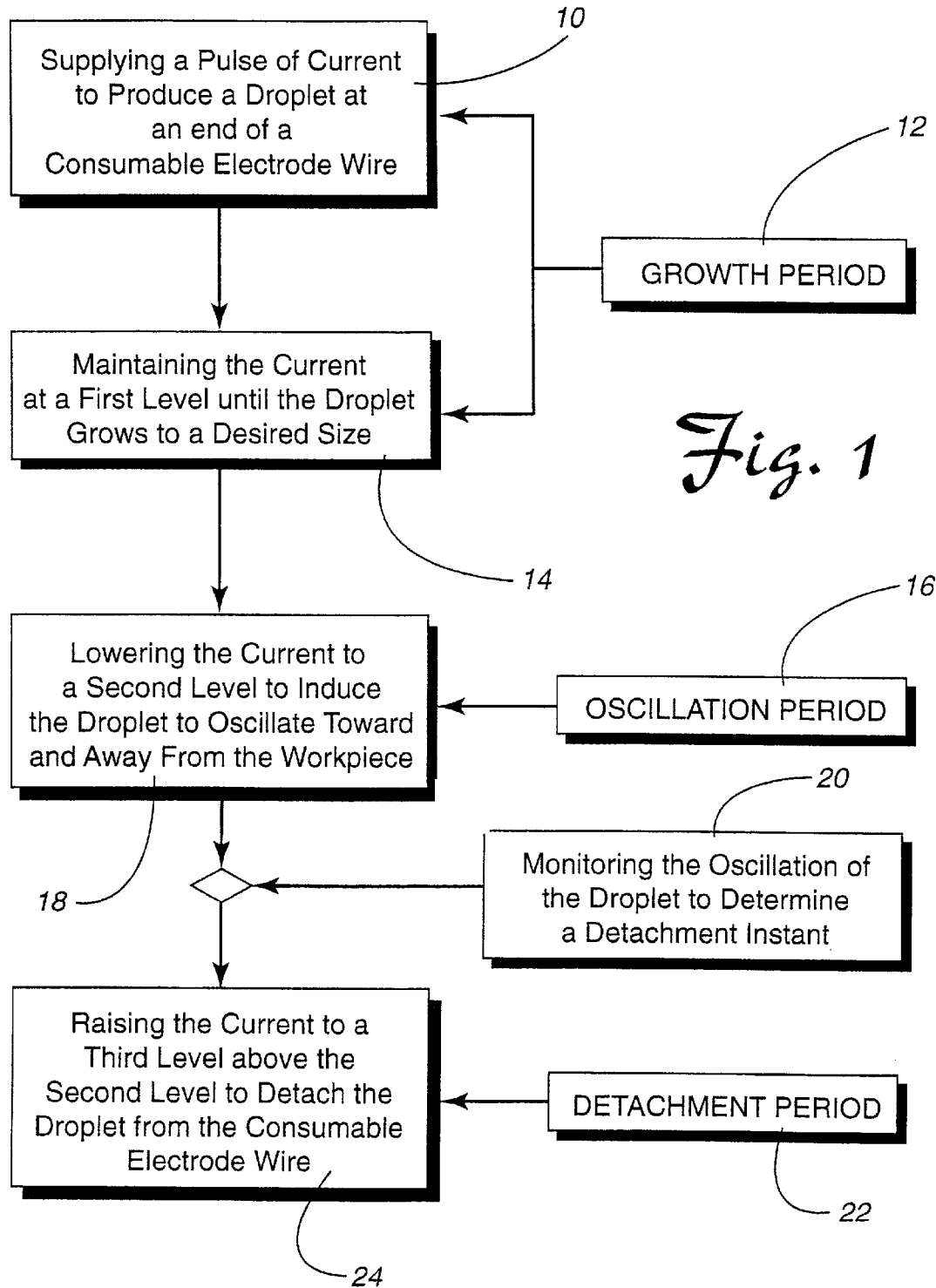
FIG. 1 is a block diagram showing the steps of a preferred embodiment of the method of the present invention.

Reference is now made to FIG. 1, showing the steps of the improved GMAW method of the present invention. In the preferred embodiment, the method includes the initial step 10 of supplying a pulse of current to a consumable wire electrode to form a droplet at the tip, which may also be termed the growth period 12 for convenience of discussion. More specifically describing the growth period 12, the current is supplied and maintained 14 at an experimentally pre-determined first level (e.g. 220–250 amperes) for a specified duration to produce a desired size, or diameter, of droplet for a given electrode material/diameter. Preferably, this level and duration of current are sufficient to create a droplet that meets the condition $0.8 \leq D_d/D_W \leq 1.4$, wherein $D_d$ is the diameter of the droplet just prior to detachment and $D_W$ is the diameter of the electrode wire.

When the preferred droplet diameter is reached, the method enters the oscillation period 16. Specifically, this includes the step 18 of lowering the current to a second, base level (e.g. 40–50 amperes) to cause the now fully-formed droplet to oscillate. The difference between the peak level and the base level of current is termed the "excite-up" level, as this is the amount of current drop required to sufficiently excite the droplet to oscillate. Preferably, the welding operation is conducted with the workpiece in a substantially horizontal position. Thus, the direction of the oscillation of the droplet is primarily toward and away from the workpiece. As discussed further below, in the preferred embodiment, the step 20 of monitoring the oscillation of the droplet may also be included.

When the droplet is moving toward the workpiece at or near its highest, or beneficial, amplitude, the method enters the detachment period 22. During this period, the step 24 of increasing the current to a third, or "cut-off" level is performed. This "cut-off" level is higher than the base current and preferably at or substantially near the first, peak current level. The concurrence of the current increase and beneficial amplitude is called the "phase match," and represents the instant in time when the electromagnetic force and momentum of the oscillation toward the workpiece are sufficient to effect detachment of the droplet from the electrode.

Thus, in principle, the method advantageously relies primarily on the momentum of the oscillating droplet to utilize current levels below the transition current to cause droplet detachment, thereby avoiding the problems associated with high currents. Also, because the detachment is actively controlled by making simple adjustments to the level and duration of the current, ODPP can be consistently achieved.

In addition to the condition of inducing oscillation to effect droplet detachment, it should be appreciated that to consistently achieve ODPP using the above-described method, certain conditions must be satisfied. More particularly, it is known that the frequency of oscillation for a liquid droplet attached to a stationary object, such as a wire electrode, depends primarily on the mass of the object. Due to the fact that the droplet diameter at the time of detachment is preferably kept substantially constant using the above-described method (e.g. $0.8 \leq D_d/D_W \leq 1.4$), the approximate mass of the droplet is always known. Thus, as should now be appreciated, the oscillation frequency remains fixed for a given set of welding conditions and a peak current level and duration.

However, it has been experimentally determined that the amplitude of oscillation is directly dependent on the current differential caused by the switch from a higher to a lower level (i.e. the excite-up level) and, thus, is not fixed. As previously noted, the method of the present invention relies primarily on the amplitude of oscillation to effect droplet detachment. Thus, an important condition for consistently achieving the transfer of one-drop-per-pulse using the above-described methodology is that the droplet must be moving toward the workpiece with an amplitude sufficient to effect detachment upon switching the current to the cut-off level.

It is known that at a certain time after switching the current to the base level, the droplet oscillation reaches a high, or beneficial, amplitude toward the workpiece. However, as the current endures, damping occurs and the oscillation decays. It has been experimentally determined that if the current is increased prior to or significantly after this beneficial amplitude occurs, regular droplet detachment is not achieved. Thus, the current must increase at or near the point in time when the beneficial amplitude occurs to ensure that the phase match condition is met.

Therefore, to control the exact time when the phase match occurs and ensure that ODPP transfer is consistently achieved, experiments are conducted wherein the oscillation of the droplet is precisely monitored (as noted by reference numeral 20 of FIG. 1) to determine the exact instant when this beneficial amplitude occurs for a given set of welding conditions. To do so, an image processing system including one or more high-frame rate cameras (i.e. up to 3000 frames per second) and a laser-optic system are utilized in conjunction with a host computer, as is described in further detail below.

Specifically, utilizing the image processing and laser-optic systems, data on the image of the droplet and the vertical coordinate may be transferred real-time into the host computer, which allows for the simultaneous processing of successive images. Hence, the direct, real-time feedback of the droplet geometry can be obtained. This permits the operator to evaluate the droplet oscillation and geometry and, thus, accurately determine the exact instant when the phase match condition occurs. Of course, once the ideal detachment instant is determined for a given set of welding conditions, the method may be implemented without the monitoring step.

In addition to phase match, it has also been determined that the cut-off level must be sufficient to detach the droplet.

More specifically, the current must reach a level that will generate the required increase in electromagnetic force that, combined with the momentum created by the beneficial amplitude, will forcibly detach the droplet from the electrode at the desired instant. Of course, for a lower beneficial amplitude (i.e. a higher droplet mass or a longer base current duration), a higher cut-off level is required, and vice-versa. In the preferred embodiment, the cut-off level and excite-up currents are maintained at approximately the same level to ensure that droplet detachment is consistently achieved. However, it should be appreciated that for a given set of welding conditions, a more precise, and perhaps lower, cut off level can be experimentally determined through trial and error.

EXAMPLES

Figure 2:
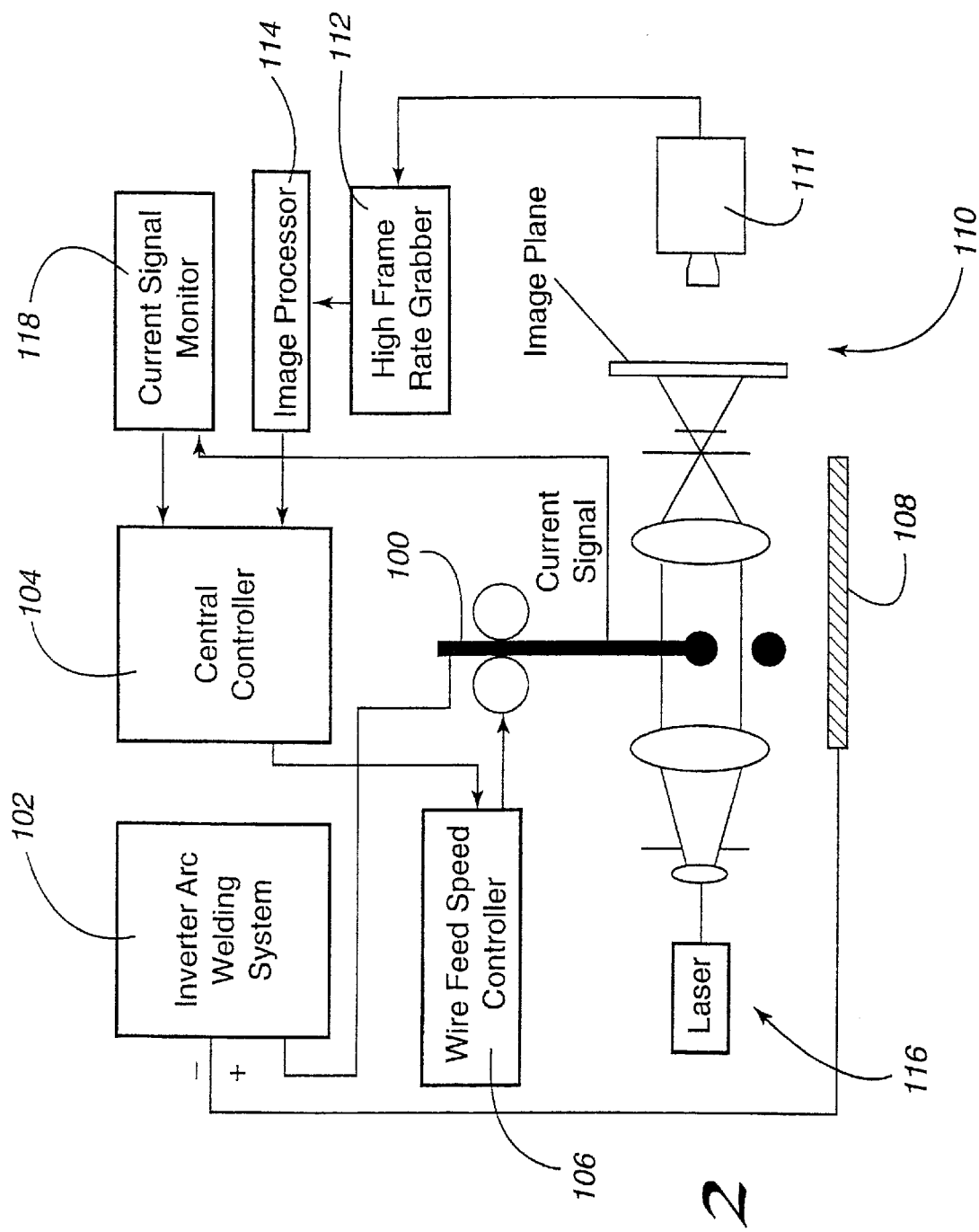
FIG. 2 is a schematical representation of a preferred embodiment of a system for performing the method of the present invention, including conducting the experiments set forth in Examples 1–4.

Referring now to FIG. 2, the experimental set-up utilized to confirm the viability of the method of the present invention is shown. A consumable wire electrode 100 comprised of mild steel and having a diameter of about 1.2 millimeters is used. The power supply 102 is an inverter arc power source of a type known in the art, such as a Miller's Maxtron 450 produced by the Miller Electric Manufacturing Company of Appleton, Wis. In constant current mode (as opposed to constant voltage), this power supply 102 provides between 15 and 565 amperes of current.

The current level is controlled by a central controller 104, such as an IBM Compatible host computer with media input capabilities that allow computer program instructions to be loaded thereon. The selection of a suitable host computer and the development of software to implement the claimed method on that system is a matter of routine skill. A specific version of a computer program used to implement the method of the present invention is the subject of a copyright entitled "Software for Control System for Gas Metal Arc Welding," the full disclosure of which is incorporated herein by reference. The controller signals the power supply 102 to change the current provided to the electrode to perform the method of the present invention, based both on information supplied by the operator and information on the welding conditions fed back to the controller 104 during the welding operation (see below).

A wire feed speed controller 106 connected to the central controller 104 serves to feed the electrode wire towards the workpiece 108. For these experiments, the extension of the electrode toward the workpiece 108 is set at 16.5 millimeters. The shielding gas (not represented in FIG. 2) is preferably a mixture of 95 percent argon and 5 percent carbon dioxide. The arc voltage levels are maintained at approximately 25 volts for this mixed shielding gas, although the use of a different shielding gas/arc voltage is also possible using this experimental set-up (e.g. pure argon with an arc voltage of 30 volts).

To experimentally determine the phase match condition, a real-time image processing system 110 is provided for monitoring the amplitude of droplet oscillation. The system includes a camera 111 having a frame rate of up to 3000 Hz. The images obtained by the camera 111 are fed real time (i.e. 800–1500 frames per second) to the controller/host computer 104 through a high frame rate grabber 112 and an image processor 114 of a type known in the art. Also, a laser-optic system 116 similarly known in the art is connected to the controller/host computer 104 to allow the vertical coordinates of the droplet to be monitored both prior to and during oscillation.

A current signal monitor 118 may also be provided which serves to determine the actual current passing through the electrode 100. This feedback is provided to the central controller 104, which may be programmed to on-line adjust the welding parameters and the wire feed speed to ensure system stability (i.e. a constant arc voltage and ODPP).

Example 1

With reference to FIGS. 3a and 3b, the implementation of the method of the present invention utilizing the above-referenced experimental set-up and parameters is graphically demonstrated. The current is maintained at an experimentally pre-determined level of 220 amperes for a pre-determined duration of approximately 12 milliseconds to grow the droplet to the desired diameter (i.e. $0.8 \leq D_d/D_W \leq 1.4$). Upon reaching the preferred size, the current is lowered to 50 amperes (at t=3 ms on FIG. 3a). Thus, the excite-up level is about 170 amperes (that is, the difference between the higher and lower current levels that is required to induce oscillation in the droplet).

As can be appreciated from viewing FIG. 3b and the accompanying illustration of the droplet/electrode tip, the change in the vertical coordinate demonstrates that the reduction in current has induced an oscillation in the droplet. This oscillation is monitored using the above-described image processing system 110/laser-optic system 116 until the droplet is moving toward the workpiece with a beneficial amplitude. At this instant, the current is increased approximately 170 amperes to 220 amperes (FIG. 3a, t=16–18 ms). The droplet is nearly instantaneously detached from the electrode (see FIG. 3b, t=18 ms). The pulse is then reset and begins with the growth period/peak current. As should also be appreciated from viewing FIG. 3b, no significant droplet oscillation occurs during the growth period (t=18 ms to t=30 ms). This ensures that the droplet is not inadvertently detached.

Example 2

FIGS. 4a, 4b and 5a, 5b demonstrate the experimental results using the proposed method to produce different droplet sizes and different transfer frequencies, while maintaining a substantially constant average current. In FIGS. 4a and 4b, the selected duration of the peak current causes the droplet to grow to approximately 1.08 millimeters ($D_d/D_W=0.9$) then detach by the active control action (that is, the reduction and subsequent increase in current). As can be seen in FIG. 4b, a single droplet is consistently detached for each pulse of current. However, instead of the normal transition current required to detach the droplet for the above-described parameters (approximately 350 amperes), the peak current level is only 220 amperes. The base current for this experiment is 40 amperes.

Figure 5A:
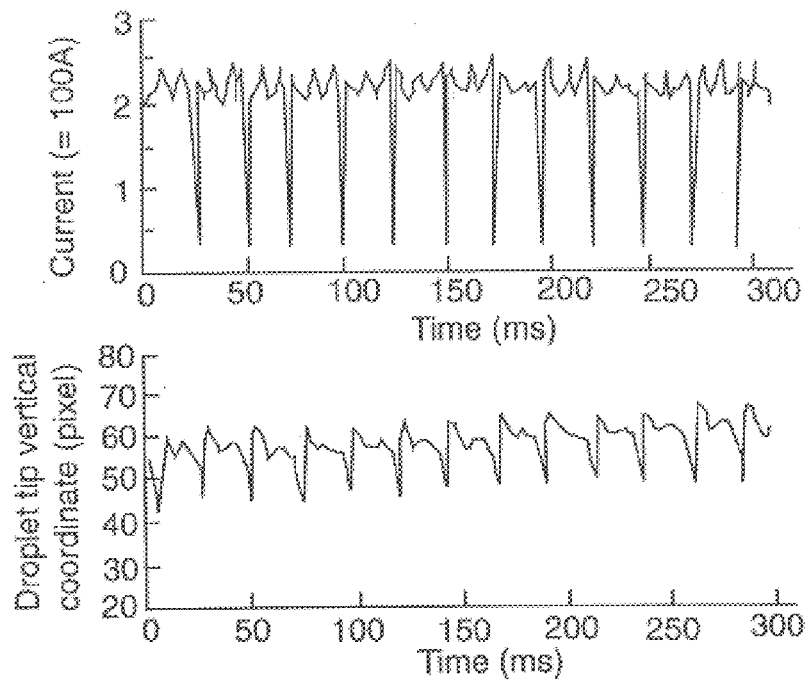
Figure 5B:
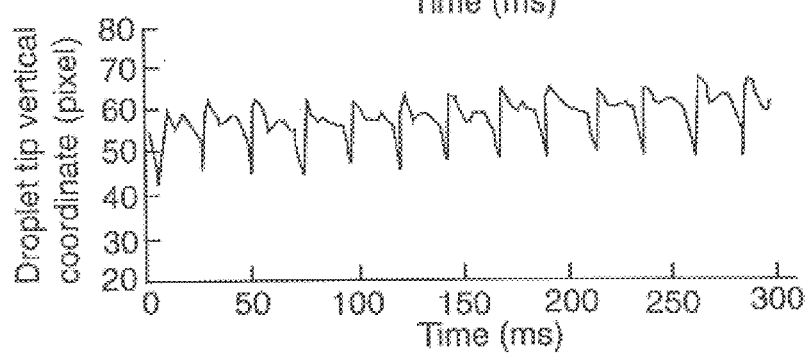

In FIGS. 5a and 5b, an increase in the duration of the peak current causes the droplet to grow to 1.68 millimeters ($D_d/D_W=1.4$) prior to detachment. This also causes the pulse period to increase which, in turn, decreases the droplet transfer frequency. Thus, larger droplets are created that detach more slowly.

However, it can be seen in FIG. 5b that droplet detachment is actively controlled and, thus, occurs only at desired instants in time when the current level is increased to at or near the peak current level. Thus, as should now be appreciated, the excite-up and cut-off levels can be fixed for a given set of welding conditions, but the duration of the peak current is adjustable to control droplet size and transfer frequency. It should also be appreciated that the base level of current necessary to induce the oscillation in the droplet endures for a very short time and, therefore, in both experiments the average current remains at approximately 210 amperes. This means that the droplet size and transfer frequency can be adjusted without altering the peak current level, as is required by prior art methods to achieve the same result.

Example 3

The above example demonstrates the usefulness of the method of the present invention in consistently achieving ODPP. However, it should be appreciated that the average current remains relatively high due to the short duration of the base current. As such a high average current is not acceptable for some welding applications, the method of the present invention must also actively control droplet detachment while allowing for the average current (heat input) to be adjusted downwardly for a particular application.

To lower the average current, a base level of current may be inserted after the cut-off level and prior to the start of the peak current without significantly affecting the amplitude of oscillation, the regularity of droplet detachment, or the droplet size at the time of detachment. FIG. 6a shows the addition of this extended base current prior to the peak current. While utilizing the same peak and base current levels as those used in Example 2 (220 amperes and 40 amperes), the addition of the base current duration advantageously reduces the average current to 83 amperes. Despite the addition of this base current period, it should be appreciated from viewing FIG. 6b that ODPP transfer is consistently achieved.

Example 4

Figure 7A:
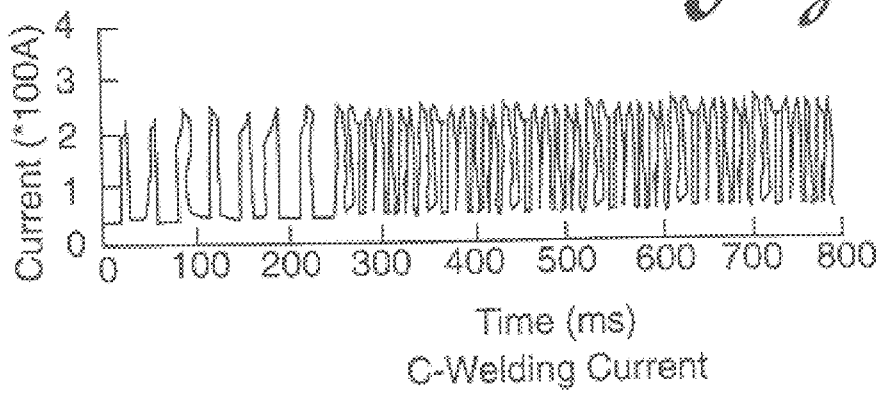
FIGS. 7a and 7b are similar pairs of graphs showing experimental results wherein the average current is adjusted on-line, as set forth in Example 4.
Figure 7A:
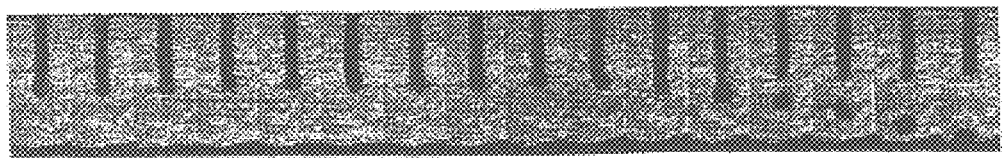
Figure 7B:
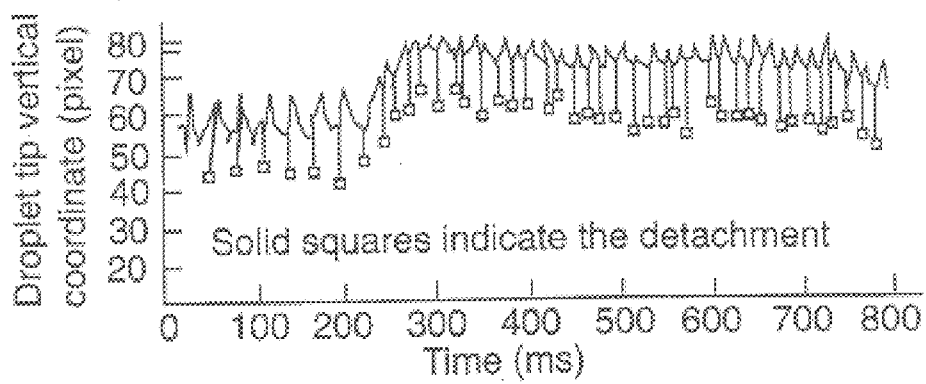
Figure 7B:
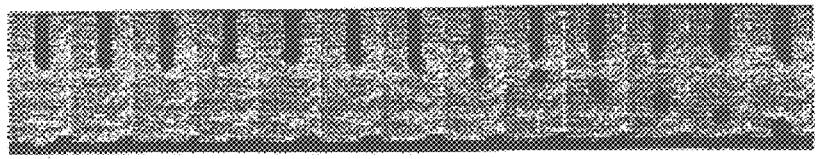

This example is similar to Examples 2 and 3, but demonstrates the ability of the system to deliver ODPP during on-line changes in the current duration to adjust the average current. Referring now to FIG. 7a, when a base current of a specified duration is inserted between the cut-off and peak current levels, the average current is experimentally determined to be 100 amperes. The peak current is maintained constant at 220 amperes for a duration of 2.8 milliseconds. Of course, as described above, the addition of the base current duration does not affect droplet detachment, as can be appreciated from viewing FIG. 7b between time t=0 and t=250 milliseconds.

At approximately t=250 milliseconds, the base current duration is removed, thereby decreasing the pulse period and increasing the average current to 165 amperes. The peak current duration is maintained at 2.8 milliseconds. As is demonstrated in FIG. 6b, while this reduction in the pulse period increases the metal transfer frequency, ODPP is still consistently achieved.

In summary, numerous benefits result from employing the concepts of the present invention. The improved method of GMAW includes providing a variable current that actively controls the detachment of droplets from the electrode, and also can achieve ODPP at relatively lower currents and heat input levels than prior art methods. Using the welding process of the present invention, the current is sufficient to produce a droplet at the end of the electrode wire, but not independently cause detachment. After the droplet reaches a desired size, the current is lowered, which induces an oscillation in the droplet such that it moves toward and away from the workpiece. The current is then increased, and the combination of droplet momentum with the increased electromagnetic force causes the droplet to detach from the electrode.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method of arc welding a workpiece using a consumable electrode wire, comprising the steps of:

supplying a current sufficient to produce a droplet having a desired size at an end of the consumable electrode wire;

lowering the current sufficient to cause the droplet to oscillate; and raising the current sufficient to detach the droplet from the consumable electrode wire, whereby the detachment of the droplet is actively controlled.

2. The method of arc welding according to claim 1, further including the step of monitoring the oscillation of the droplet to determine a detachment instant between the steps of lowering the current and raising the current.

3. The method of arc welding according to claim 1, further including the step of utilizing the electromagnetic force of the raised current and the momentum created by the oscillation of the droplet to detach the droplet.

4. The method of arc welding according to claim 1, wherein the consumable electrode wire has a diameter $D_W$, the droplet has a diameter $D_d$, and the desired size of the droplet upon said step of lowering the current is such that $0.8 \leq D_d/D_W \leq 1.4$.

5. The method of arc welding according to claim 1, further including the step of providing a gas for shielding the arc, whereby oxidation of the droplet is substantially prevented during transfer to the workpiece.

6. A method of arc welding a workpiece using a consumable electrode wire, comprising the steps of:

supplying a pulse of current having a variable waveform;

maintaining the waveform of the current pulse at a first level sufficient to produce a droplet having a desired size at an end of the consumable electrode wire;

lowering the waveform of the current pulse to a second level sufficient to cause the droplet to oscillate toward and away from the workpiece;

raising the waveform of the current pulse to a third level above the second level at a selected oscillation of the droplet toward the workpiece in order to detach the droplet from the consumable electrode wire;

whereby the transfer of the droplet to the workpiece is actively controlled such that uniform droplet transfer per pulse is achieved.

7. The method of arc welding according to claim 6, wherein the consumable electrode wire is formed of mild steel having a diameter of approximately 1.2 millimeters.

8. The method of arc welding according to claim 7, wherein the first level of current is a peak current between approximately 220–250 amperes.

9. The method of arc welding according to claim 8, wherein the second level of current is a base current between approximately 40–50 amperes.

10. The method of arc welding according to claim 6, further including the step of providing a gas for shielding the arc, whereby oxidation of the droplet is prevented during transfers to the workpiece.

11. The method of arc welding according to claim 6, wherein the first, second and third current levels are all below a transition current level defined as a level of current sufficiently high to independently cause detachment and transfer of the droplet having a diameter substantially equal to that of the electrode.

12. A method of arc welding a workpiece using a consumable electrode wire, comprising the steps of:

supplying a current at a first level sufficient to produce a droplet having a desired size at an end of the consumable electrode wire;

lowering the current to a second level to cause the droplet to oscillate toward and away from the workpiece;

raising the current to substantially near the first level at a selected oscillation of the droplet toward the workpiece to detach the droplet from the consumable electrode wire;

whereby the detachment of the droplet from the electrode wire is actively controlled.

\* \* \* \* \*